(12) United States Patent
Matus et al.

(10) Patent No.: US 9,308,597 B2
(45) Date of Patent: *Apr. 12, 2016

(54) METHOD AND APPARATUS FOR CONTROLLING WELD STATES OF A MIG WELDING PROCESS

(75) Inventors: Tim A. Matus, San Antonio, TX (US); Bernard J. Vogel, Troy, OH (US); Bruce Albrecht, Grayslake, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 2244 days.

This patent is subject to a terminal disclaimer.

(21) Appl. No.: 11/275,106

(22) Filed: Dec. 9, 2005

(65) Prior Publication Data

US 2006/0076331 A1    Apr. 13, 2006

Related U.S. Application Data

(62) Division of application No. 10/605,332, filed on Sep. 23, 2003, now Pat. No. 7,049,545.

(51) Int. Cl.
  *B23K 9/10*    (2006.01)

(52) U.S. Cl.
  CPC ............. *B23K 9/1006* (2013.01); *B23K 9/1043* (2013.01)

(58) Field of Classification Search
  CPC ...................................... B23K 9/1006–9/1093
  USPC ............... 219/130.1, 130.21, 130.33, 137.71; 363/89
  See application file for complete search history.

(56) References Cited

U.S. PATENT DOCUMENTS

| | | | |
|---|---|---|---|
| 4,508,954 A | 4/1985 | Kroll | |
| 4,517,439 A * | 5/1985 | Colley | 219/130.33 |
| 5,319,533 A | 6/1994 | Reynolds | |
| 5,601,741 A | 2/1997 | Thommes | |
| 5,742,029 A | 4/1998 | Stava | |
| 5,824,990 A | 10/1998 | Geissler | |
| 5,916,464 A * | 6/1999 | Geiger | 219/137.71 |
| 5,991,180 A | 11/1999 | Vogel | |
| 6,002,103 A | 12/1999 | Thommes | |
| 6,043,652 A | 3/2000 | Liu | |
| 6,051,806 A * | 4/2000 | Shikata et al. | 219/130.33 |
| 6,115,273 A | 9/2000 | Geissler | |
| 6,160,241 A | 12/2000 | Stava | |
| 6,177,645 B1 | 1/2001 | Church | |
| 6,193,032 B1 * | 2/2001 | Lesieutre et al. | 188/380 |
| 6,236,014 B1 | 5/2001 | Ulrich | |
| 6,239,407 B1 | 5/2001 | Thommes | |
| 6,329,636 B1 | 12/2001 | Geissler | |
| 6,507,004 B2 * | 1/2003 | Ikeda et al. | 219/130.21 |
| 6,617,549 B2 | 9/2003 | Ihde | |
| 6,713,708 B2 | 3/2004 | Hedberg | |
| 6,815,639 B2 | 11/2004 | Geissler | |

(Continued)

*Primary Examiner* — Sang Y Paik
(74) *Attorney, Agent, or Firm* — Fletcher Yoder P.C.

(57) ABSTRACT

Methods, controllers, and power sources for controlling weld states of a MIG welding machine having a 115 volt inverter are provided. The regulation of a power source may include determining a command current signal based on a maximum allowable voltage error determined from the output condition at the weld. The signal may be provided to a controller that regulates the output of the 115 volt inverter. A MIG welding power source may include the 115 volt inverter and a processor that determines a maximum allowable voltage offset from a voltage feedback signal and a voltage level. The processor may provide a signal based on a determined instantaneous command current to regulate the 115 volt inverter.

20 Claims, 10 Drawing Sheets

(56) References Cited

U.S. PATENT DOCUMENTS

| | | |
|---|---|---|
| 6,847,827 B2 | 1/2005 | Helm |
| 6,849,827 B2 | 2/2005 | Thommes |
| 6,987,242 B2 | 1/2006 | Geissler |
| 7,049,546 B2 | 5/2006 | Thommes |
| 7,235,759 B2 | 6/2007 | Geissler |
| 7,319,206 B2 | 1/2008 | Thommes |
| 2002/0008095 A1* | 1/2002 | Norrish et al. .......... 219/137 PS |
| 2002/0047000 A1 | 4/2002 | Geissler |
| 2002/0117489 A1* | 8/2002 | Arndt et al. ................ 219/130.5 |
| 2003/0111452 A1 | 6/2003 | Ihde |
| 2007/0278197 A1 | 12/2007 | Geissler |
| 2007/0295703 A1 | 12/2007 | Thommes |
| 2009/0230941 A1 | 9/2009 | Vogel |
| 2009/0266805 A1 | 10/2009 | Thommes |
| 2010/0193487 A1 | 8/2010 | Geissler |
| 2014/0021179 A1 | 1/2014 | Schartner |

* cited by examiner

METHOD AND APPARATUS FOR CONTROLLING WELD STATES OF A MIG WELDING PROCESS

CROSS-REFERENCE TO RELATED APPLICATION

The present invention is a divisional and claims priority of U.S. patent application Ser. No. 10/605,332 filed Sep. 23, 2003, the disclosure of which is incorporated herein.

BACKGROUND OF THE INVENTION

The present invention relates generally to welding systems and, more particularly, to a welding machine designed to introduce a consumable wire electrode to a weld and having an inverter to condition a 115 volt raw power input to a form usable by the welding process.

MIG welding, formerly known as Gas Metal Arc Welding (GMAW), combines the techniques and advantages of TIG welding's inert gas shielding with a continuous, consumable wire electrode. An electrical arc is created between the continuous, consumable wire electrode and a workpiece. As such, the consumable wire functions as the electrode in the weld circuit as well as the source of filler metal. MIG welding is a relatively simple process that allows an operator to concentrate on arc control. MIG welding may be used to weld most commercial metals and alloys including steel, aluminum, and stainless steel. Moreover, the travel speed and the deposition rates in MIG welding may be much higher than those typically associated with either Gas Tungsten Arc Welding (TIG) or Shielded Metal Arc Welding (stick) thereby making MIG welding a more efficient welding process. Additionally, by continuously feeding the consumable wire to the weld, electrode changing is minimized and as such, weld effects caused by interruptions in the welding process are reduced. The MIG welding process also produces very little or no slag, the arc and weld pool are clearly visible during welding, and post-weld clean-up is typically minimized. Another advantage of MIG welding is that it can be done in most positions which can be an asset for manufacturing and repair work where vertical or overhead welding may be required.

To ease portability, MIG welding systems have been designed such that the wire feeder and power supply circuitry are integrated within a single housing. Further, MIG systems have been designed to be operable on a 115 VAC input. As a result, these MIG systems may be transported to multiple welding sites and plugged into a standard and commonly available 115 volt terminal for power rather than a less common 230 volt terminal. Designing the MIG machine to be operable on a 115 volt line and integrating the wire feeder and power source in a common housing provides a relatively compact and portable unit. Generally, however, the output welding current of these portable machines must be limited so that line current does not exceed the capacity of the circuit breaker protecting the 115VAC line. The circuit breaker is typically a 15 or 20 amp circuit breaker.

Figure 1:
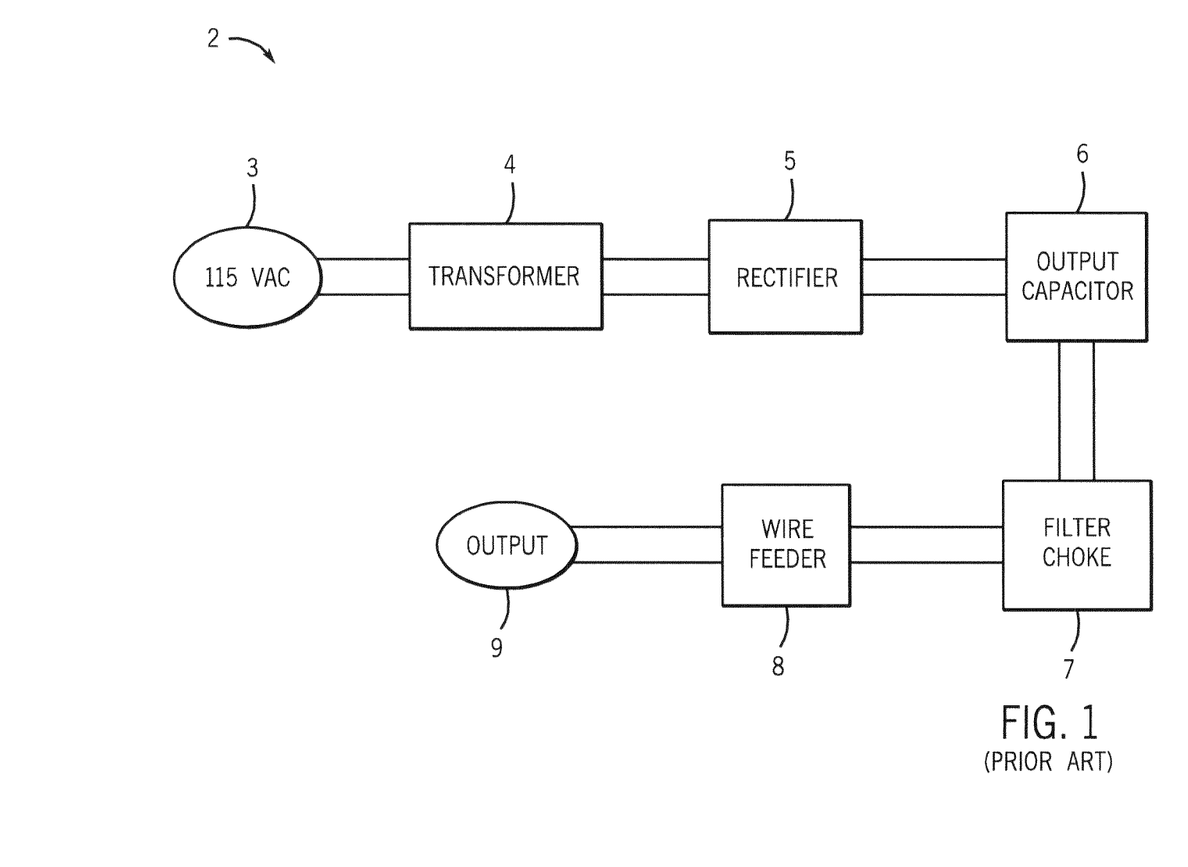
FIG. 1 is a block diagram of a prior art power supply circuit.

A prior art MIG welding machine operable on a 115 volt input is schematically shown in FIG. 1. A typical 115VAC MIG machine 2 consists of a line frequency transformer 3 designed to receive an 115VAC input 4 and feed the input to either a controlled or uncontrolled rectifier 5. The rectifier in turn feeds an output capacitor 6 and output filter choke 7. The capacitor 6 and filter choke 7 determine the welding characteristics of the MIG machine. The capacitor 6 provides an instantaneous source of stored energy which assists in the welding process by providing the high currents typically required. The output filter choke 7 limits the rate of rise of the output current which controls the harshness of the arc as well as the spatter level. That is, capacitor 6 and filter choke 7 regulate operation of wire feeder 8 to control the output 9 provided to a weld.

MIG welders having 115VAC transformer-rectifier combination provide a relatively compact and relatively portable machine. However, these known MIG welders typically weigh 50 to 60 pounds, or more. In addition, these known MIG welders typically have a wide profile to accommodate fitting of the transformer and wire feeder in the single housing. These features detract from the portability of the welder. Also, as mentioned above, the output rating must be limited so as not to trip the input line circuit breaker. The output capacitor has a beneficial effect of being able to supply large instantaneous currents to the output, but tends to make the line draw higher because of the poor form factor of the line current. As a result, the welder has a relatively poor power factor. In addition the overall power efficiency of the transformer rectifier circuit is fairly low. For example, for a given KVA input drawn from the AC line, only about 60-65 percent is converted to usable output welding power.

It is therefore desirable to design a portable welder to carry out a MIG welding process having a 115 volt inverter to condition a raw power input with improved power factor characteristics and improved portability.

BRIEF DESCRIPTION OF THE INVENTION

The present invention is directed to a MIG welding machine having a 115 volt inverter that overcomes the aforementioned drawbacks. Incorporation of the 115 volt inverter into the MIG welding power source reduces the weight of the power source thereby increasing its portability. The power source includes a power factor correction circuit to provide a near-unity power factor such that output power of the inverter is more efficiently provided. Additionally, the 115 volt inverter is constructed such that for short periods of time, the inverter may output power at a level that exceeds its power rating.

Therefore, in accordance with one aspect of the present invention, a MIG welding power source has a raw power input configured to receive a raw power signal for a MIG welding process. The raw power signal has a voltage level of at least approximately 115V. The power source includes an inverter configured to receive the 115V signal and provide a welding output suitable for MIG welding. The power source further includes a welding power output configured to supply the welding output for a MIG welding process.

In accordance with another aspect, the present invention includes a method of regulating a power source having an 115V inverter to condition raw power into a form usable by a MIG welding process. The method includes determining a maximum allowable voltage error given an output condition at a weld and determining an instantaneous command current given the maximum allowable voltage error. The method further includes inputting a signal proportional to the instantaneous command current to a controller of the 115V inverter. The signal is designed to regulate the controller to provide a control signal to regulate an output of the 115V inverter.

According to another aspect of the present invention, a MIG welding system includes a power source having an 115V inverter configured to condition a raw power input into a form usable by a MIG welding process. They system also has a wire feeder connected to the power source and configured to introduce a consumable electrode to a weld and an electrode holder configured to receive the consumable electrode and place the consumable electrode in relative proximity to a workpiece at the weld.

According to yet a further aspect of the present invention, a method of controlling output of a MIG welding power source includes a step of detecting a prolonged short circuit at a weld. The method also includes the step of increasing output current at a first ramp rate so as to clear the prolonged short circuit at the weld. The output current is then increased to a second ramp rate once the output current reaches a preset threshold.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 2:
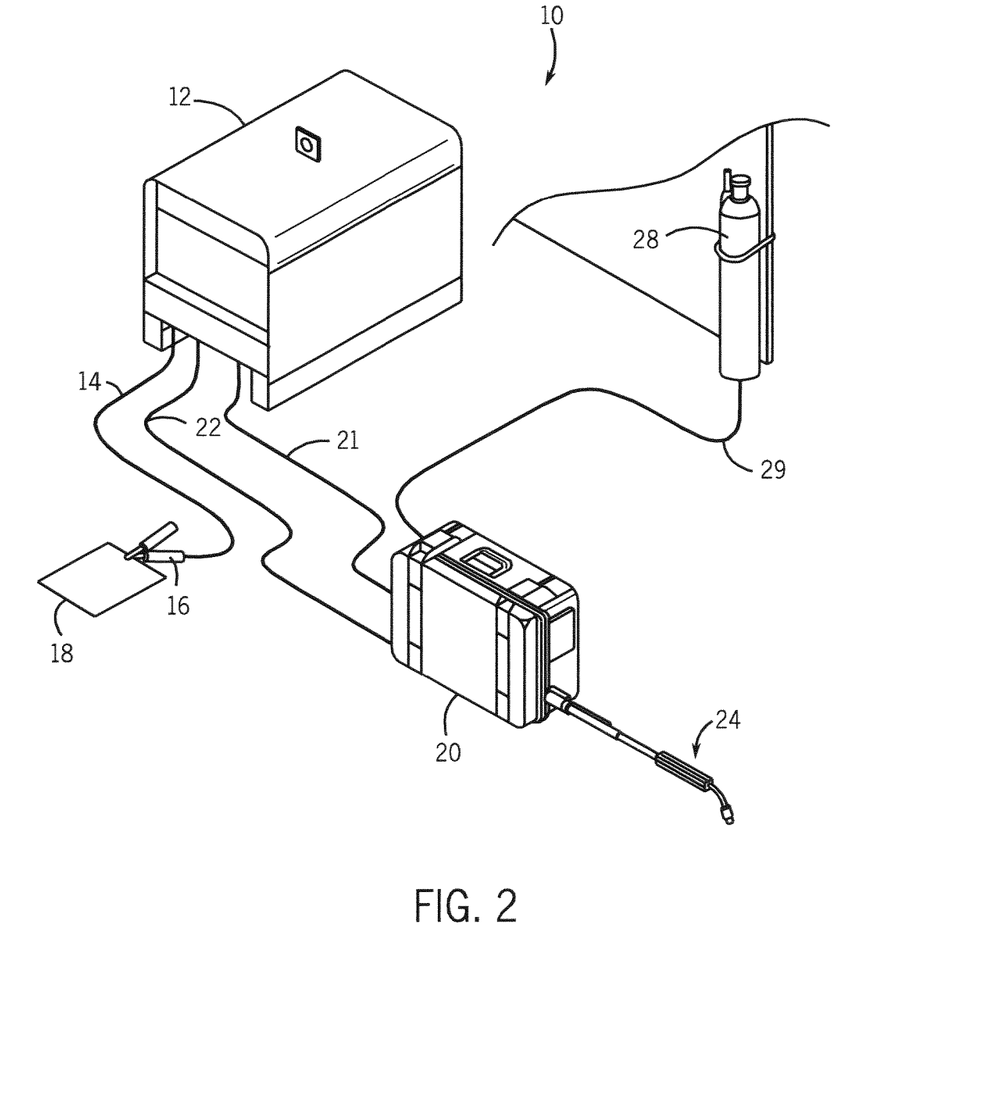
FIG. 2 is a pictorial view of a welding system in accordance with one aspect of the present invention.

Referring to FIG. 2, a welding-type system 10 is show incorporating the present invention. System 10 includes a portable power source 12, which can be an AC or a DC welding power supply operable in either a constant current (CC) or constant voltage (CV) mode. The power source 12 has a work cable 14 and clamp 16 designed to hold a workpiece 18 for welding. Power source 12 is also connected to a wire feeder 20 via an input power cord or cable 21. Cable 21 is designed to translate power from the power source 12 or other power supply to the wire feeder. Also connected between the power source 12 and the wire feeder 20 is a weld cable 22. The wire feeder 20 also includes a welding torch or gun 24 and a voltage sensing lead with clip (not shown) configured to provide voltage at the weld feedback to the wire feeder and/or power source. A shielding gas cylinder 28 is also connected to the wire feeder 20 to provide shielding gas through hose 29 for the welding process. Alternately, the wire feeder 20 may be disposed in the power source 12 to provide an integrated MIG welder.

The wire feeder 20 includes a wire drive assembly (not shown) that includes a spool of welding wire (not shown) that is supplied to the weld under control of a controller (not shown) that is connected to the power source 12 through cord 22. The controller is governed by a microprocessor capable of being programmed to operate according to certain algorithms and/or programs. User selections or inputs received by the controller from a display and control panel (not shown) and an internally programmed algorithm cause welding system 10 to operate according to the user selections.

When the welding torch 24 is positioned proximate to workpiece 18, welding wire is fed into contact with the workpiece 18. Once triggered, an electrical current and voltage are generated to cause the welding wire to be heated and melt. As a result, an electrical arc is established which causes the welding wire to continue to melt as well as transfer the melted welding wire to the workpiece 18 where the welding wire fuses and cools with the workpiece 18. Because the electrical energy supplied to the welding system is typically greater than that required to melt the welding wire, most of the remaining energy is in the form of heat which is transferred to the surface of the workpiece 18 resulting in the workpiece 18 also melting and improved bonding between the melted welding wire and the workpiece 18. As the welding torch 24 is translated across the workpiece 18, melted welding wire is continuously transferred to the workpiece 18.

In one exemplary embodiment, the wire feeder is configured to operate on 115 VAC control input power. The power source is designed to operate in either a CC or CV mode. The wire feeder is designed to introduce flux cored, solid steel, or stainless steel welding wire to a weld. One skilled in the art would appreciate that these values are illustrative of only one particular welding assembly and that the present invention is equivalently applicable with other welding systems having different operating specifications and other consumable electrodes.

To reduce the weight of the power source and thereby improve its portability characteristics, the power source has an inverter assembly. Replacing the standard transformer-rectifier circuit with a high frequency inverter power circuit reduces the weight of the power source and improves the physical profile to allow for greater portability. For instance, by replacing the transformer-rectifier circuit with the inverter circuit the weight of the machine may be reduced by half or more. Additionally, the power circuit for the inverter requires significantly smaller components than the standard transformer-rectifier circuit, which can be more readily arranged into a smaller, narrow package further improving the portability of the MIG welder.

In addition, the high frequency inverter circuit typically has a higher power efficiency than the transformer-rectifier. The inverter circuit can be further combined with a power factor correction circuit (PFC) to further reduce the line draw for a given output power. That is, for a high frequency inverter combined with a PFC, for a given KVA input drawn from the AC line, 80-85 percent may be converted into a usable output welding power. This is a significant improvement in line-draw efficiency that can translate directly into higher output ratings for the inverter-based MIG machine compared to a standard transformer-rectifier MIG machine.

Figure 3:
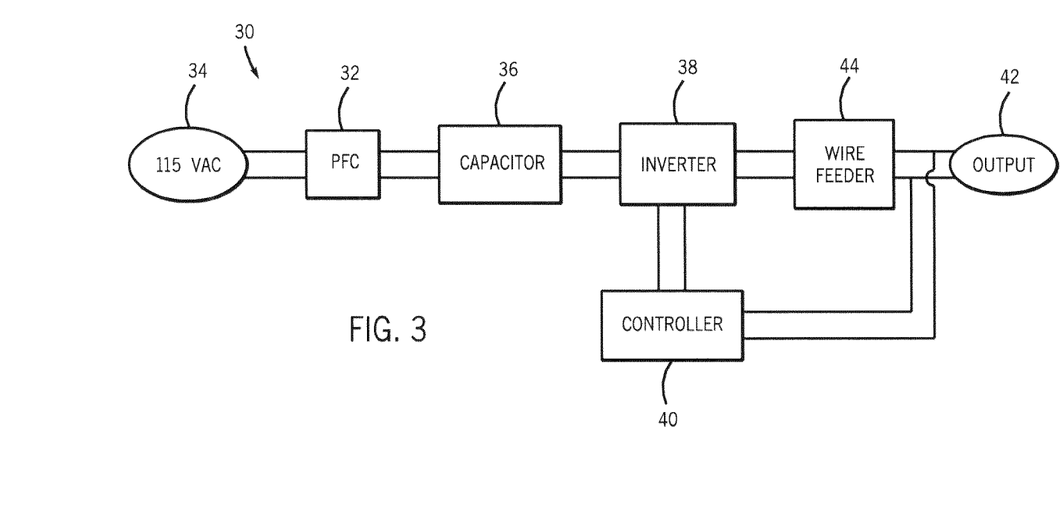
FIG. 3 is a block diagram of a power supply circuit in accordance with one embodiment of the present invention.

Referring to FIG. 3, a schematic representation of a power supply circuit of a power source in accordance with the present invention is shown. The power supply circuit 30 includes, in one embodiment, a PFC stage 32 designed to receive an 115VAC input 34. The PFC stage 32 is designed to convert the incoming AC power signal into a DC bus voltage. In one embodiment, the PFC stage 32 converts the incoming AC signal to a 400VDC signal. The PFC stage 32 also re-shapes the input current to attain an improved form factor and, subsequently, a relatively high power factor, e.g. 0.95 to 0.99. The DC bus voltage is fed to an input capacitor 36 which provides a source of stored energy to inverter circuit 38 to provide power throughout the complete cycle of the input voltage sine wave. Capacitor 36 may also provide the inverter 38 with the capability of short bursts of higher than normal output power without increasing the AC line draw. In this respect, energy storage capacitor 36 is similar to the capacitor in a known transformer-rectifier topology; however, capacitor 36 stores energy at a much higher voltage, i.e. approximately 400VDC. Since the amount of energy stored in the capacitor 36 is a function of the voltage squared, a much smaller capacitor may be used to store energy at a higher voltage which is advantageous for reducing the weight of the power source.

The DC bus voltage is fed to a high frequency inverter circuit 38 which converts the power to the voltage and current levels required for the welding process. A controller 40 is used to control the output of the inverter 38. The output may be controlled by adjusting the duty cycle of the transistors (not shown) of inverter 38. The controller receives, as inputs, feedback regarding the output voltage and/or output current 42. The controller utilizes the feedback signals to cause the output of the inverter to follow a desired waveform based on the particular conditions of the welding arc. For high frequency inverter 38, the controller 40 sets the output characteristics of the welding power source. In contrast, for standard transformer-rectifier power sources, the output capacitor and filter choke set the output characteristics. The inverter then provides a conditioned and controlled output to wire feeder 44.

Figure 4:
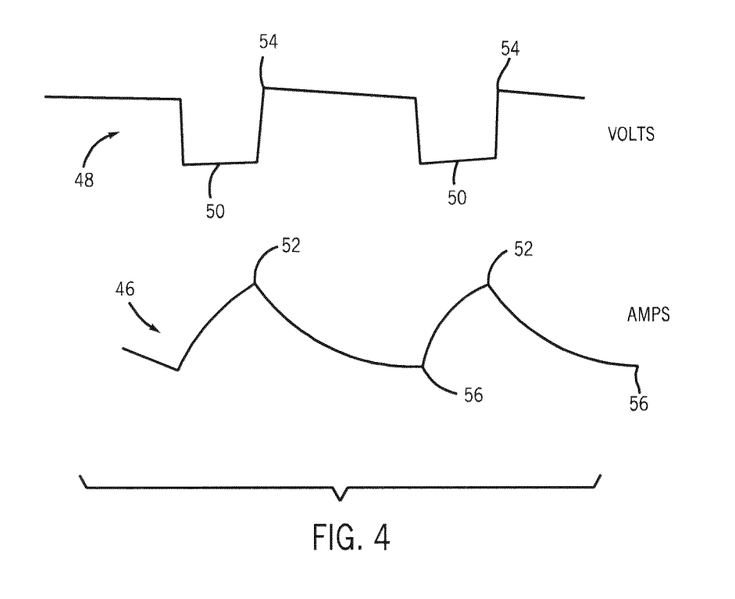
FIG. 4 represents a pair of waveforms illustrating a short-arc MIG welding process.

The controller for the inverter may demand that the power source deliver high currents and/or high voltages resulting in high output power demands at times based upon the conditions of the arc. This is particularly true for a MIG welding process known as short-arc, where the arc load, rather than appearing as a fairly constant load, is comprised of repetitive periods of short circuits and open arc. Short-arc is a preferred process for low current, low heat input applications with smaller diameter welding wires. FIG. 4 illustrates a typical short-arc welding current waveform 46 and voltage waveform 48. As shown, during a short circuit when the voltage 48 falls to a low value 50, the current 46 will naturally start to rise to a maximum level 52 because of the constant voltage characteristic of the power source, and when the short clears 52 the current will naturally fall back to some lower level 56. At the moment the short clears 52, the current and voltage are both high for some period of time as the current naturally falls based on either real or emulated circuit inductance.

The peak currents, during and immediately after the short circuit, can be two to three times, or more, of the average current. For an 115VAC MIG welding machine, the average output current is generally limited to less than 150 amps. In this regard, the peak short circuit current demands become a significant issue, because the peak currents can be typically two to three times or more of the actual rating of the power source. For larger welding machines with higher output ratings, the high short circuit currents are of less concern and therefore the power supply circuitry can simply deliver the current and voltage as determined by the arc and by the particular dynamic characteristics of the power source.

With a standard MIG welder having a transformer-rectifier circuit operable on an 115VAC input, these high current demands can be met by using energy stored in the output capacitor, while at the same time momentarily drawing higher currents from the AC line. A typical circuit breaker can handle significant short term overloads because of their relatively slow time constant. This allows these types of machines to momentarily draw more power from the line as needed to replenish the output capacitor following periods of high current and voltage demand.

In contrast, with an inverter based circuit topology, all of the power delivered to the output is processed in near real-time because of the limited amount of storage capacitance on the output side. As such, the inverter circuit may be combined with a large storage capacitor (not shown) on the output as well as a physical inductor (not shown) to control the dynamic load line; however, these additional components may be bulky and therefore mitigate the benefits of the inverter circuit by adding additional weight and size, as well as cost to the power source. In addition, with this configuration, the dynamics are controlled by physical components rather than a controller which limits the ability to have different dynamic characteristics to suit different welding applications.

The processing of power by an inverter circuit is typically handled by semiconductor switches (not shown), which are generally sized according to the average output rating of the machine. In addition, because of the efficiency of these types of circuits, most of the components are physically small, such as the transformers (not shown) and the heat sinks (not shown) required for the semiconductors, which leads to the small size and low weight of the inverter. In addition the control circuits for the inverter 36 and the PFC 34 are designed for specific maximum current levels. As a result, it is not practical to simply draw more power off the line as required by the load than the control and semiconductors have been sized to handle, even for short durations. Further, to improve portability, it is not practical to use oversized semiconductors, heat sinks, transformers, and the like, to handle whatever the load demanded. Preferably, the peak power demands of the load are substantially minimized, while at the same time, managing the peak power that has to be delivered by the inverter 36.

Figure 5:
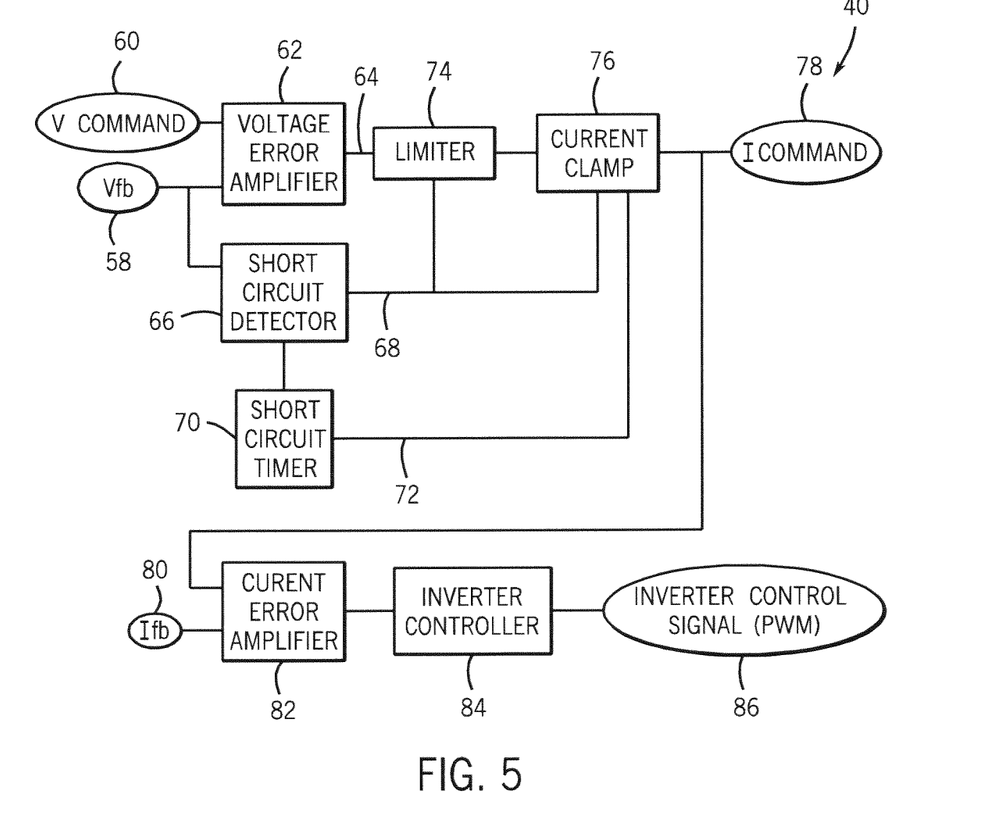
FIG. 5 is a block diagram illustrating a controller for an 115V inverter for a MIG power source.

Referring now to FIG. 5, controller 40 of FIG. 3, which is designed to control inverter 36 so that the peak current and power demands are reduced and controlled to fall within the capabilities of the power source, is shown in a block diagram. A voltage feedback signal 58, Vfb, proportional to the actual output voltage of the power source is subtracted from a command signal 60, Vcommand, by a voltage error amplifier 62 to produce a voltage error signal 64, Verror. The voltage feedback signal 58 is also input to a short circuit detector 66 which generates a logic signal, Vshort, 68 indicating whether the condition of the welding arc load is at a short circuit condition or an open arc condition. The controller includes a short circuit timer 70 which inspects the duration of the short circuit phase of the voltage feedback signal to create another logic signal 72, Vclear, which indicates that a particular short circuit has exceeded a preset time limit, i.e. typically approximately five milliseconds. The rate of change of the voltage error signal is controlled by a limiter block or stage 74. The rate of change of the voltage error amplifier can be set differently for the arc phase and the short circuit phase of the arc by use of logic signal 68. The output of the limiter block 74 is fed to a current clamp stage 76 which clamps the voltage error signal to a maximum level. The maximum level is dependent upon the particular conditions of the welding arc, as indicated by the logic signals 68 and 72. In addition, the clamp level may be set based upon other inputs not specifically illustrated. These other inputs may include the welding wire size and type, the type of shielding gas, and the speed of the wire being fed into the arc by the wire feeder. These other inputs may be either set-up or stationary inputs, or dynamic inputs (such as the wire feed speed), as opposed to the signals 68 and 72 which are real-time indicators of the welding process.

The output of the current clamp block 76 is a current command signal 78, Icommand, that is input to the inverter detailing what level of output current the inverter should produce to control the welding process. A signal 80 proportional to the actual output welding current, Ifb, is subtracted from the Icommand signal 78 by a current error amplifier 82, which in turn feeds the inverter control circuit 84, the output of which is normally a pulse width modulated (PWM) signal 86 designed to control the output of the inverter.

Control of the inverter is predicated upon detection of the state of the welding process. That is, control of the inverter depends on whether a short circuit or open arc condition is detected at the weld. Generally, when the welding process is initiated, the output condition at the weld corresponds to an open arc phase condition. When an open arc condition is detected, the current is clamped or limited to a maximum value which is compatible with the steady state rating of the power source. For example, if the power source is rated at 150 Amps average, then the maximum current during the arc phase would be limited to approximately 150 amps. When a short is detected at the weld, the output current of the inverter is increased at a relatively fast pace. For instance, the rate may be 100-200 Amps/msec which allows the current to reach a short circuit clamp level quickly. This provides improved short clearing in a reasonable time by providing a greater area under the amperage-time curve.

The maximum current allowed during a short circuit is clamped or limited to a level based upon the particular welding conditions at the output. These conditions may include wire size and type, as well as shielding gas and wire feed speed. The instantaneous maximum current level is preferably set to a value in which most short circuits will clear normally during steady-state welding conditions. It is generally understood that if a short circuit does not naturally clear itself within a reasonable time (typically 4-5 msec), then the arc process is susceptible to instability. Therefore, in accordance with the present invention, if a short circuit lasts for longer than a predefined period of time, the output current of the inverter is allowed to rise at a relatively high rate (approx. 100-200 Amps/msec) to a higher current level, i.e. Iclear, to help clear the short. If the short circuit persists at this higher current level remedial action must be taken to alleviate the non-cleared short. Examples of remedial action include shutting off the inverter output or momentarily stopping or reversing the wire feed. The total time duration of the current at the Iclear level is preferably limited to a value below the thermal time constants of the inverter power components and heat sinks, so that the temperatures of these components remain at desired levels.

If the short circuit clears at the Iclear level, the current output of the inverter is immediately allowed to lower to a level lower than the Iclear level, such as the short circuit clamp level. If the short circuit clears at the clamp level, the inverter output is then allowed to decay down to the maximum allowed arc phase current over a short time interval (1-2 msec). This post-short circuit time interval briefly allows relatively high currents with normal arc voltages to be output by the inverter. This post-short circuit time interval is preferably short because during this interval the inverter may be required to deliver greater than its normal output power rating. During this interval the input DC bus capacitor supplies additional energy to the inverter circuit. In addition, the higher output power may cause greater losses in the power semiconductors and other inverter components. If this time interval of higher output power is kept short, a minimal temperature rise caused by the additional losses will be experienced because of the thermal time constants of the semiconductors as well as the thermal time constants of the transformer, heat sinks and other components. If the clamp current for the short circuit phase is less than the maximum allowed current for the arc phase, then the post-short circuit phase may be ignored.

The Iclamp level, set for a typical short circuit, as well as the Iclear level may be higher than the average current rating of the power source; however, these current levels are preferably only allowed during a short circuit and for a very short time after the short clears. The output voltage during a short circuit is typically less than half of what it is during the arc phase, thus the current may be approximately twice the normal average rated current without requiring the inverter circuit to deliver more than its rated output power. In addition the highest current level is only allowed during a short circuit when the output voltage is low. When the short circuit clears the current is preferably immediately be lowered to the clamp level.

Figure 6:
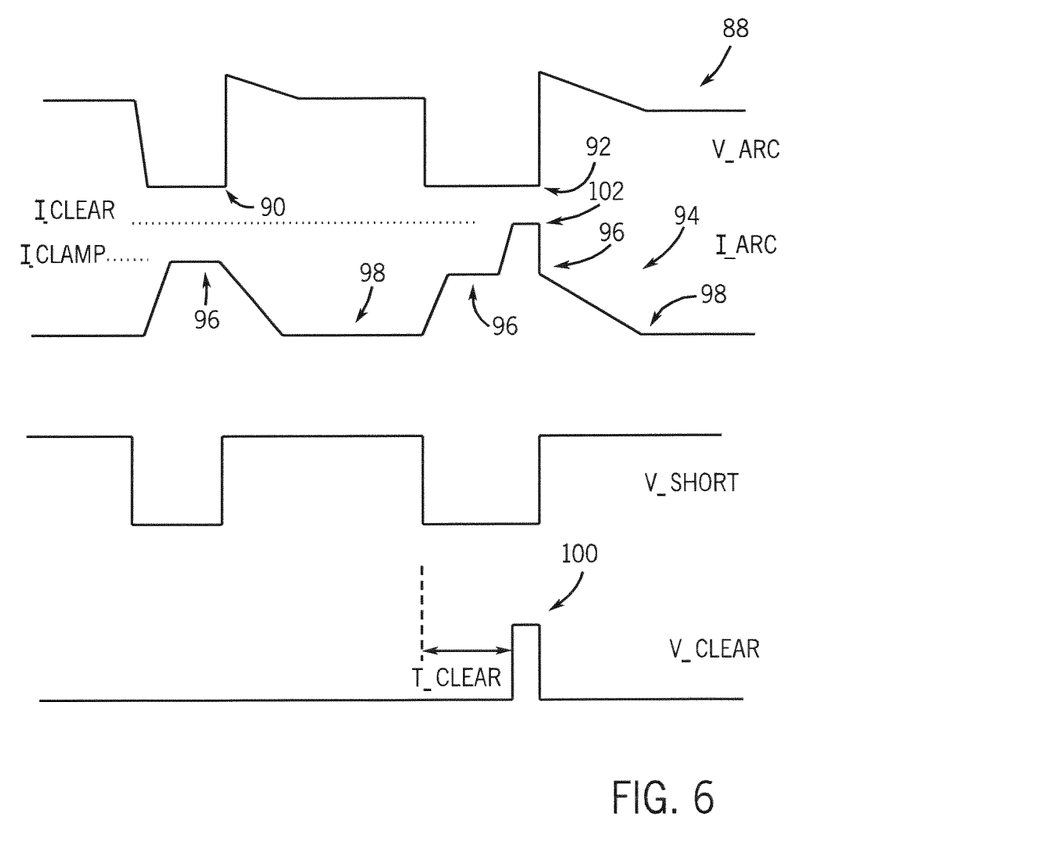
FIG. 6 represents welding and logic waveforms illustrating inverter control in accordance with the present invention.

FIG. 6 illustrates typical waveforms associated with the above control process. Signal 88 corresponds to an arc voltage showing two short circuit events 90 and 92. The first short circuit 90 clears in a normal fashion within the allowed time limit, while the second short circuit 92 does not clear within the allowed time limit. The second trace 94 corresponds to the arc current. It can be seen that the current rises fairly quickly to the Iclamp limit 96 during the first short circuit 90, and remains at that level for the duration of the short circuit 90. Once the short 90 clears the current 94 naturally decreases to level 98 dictated by the specific conditions of the arc. For the second short circuit 92, the current again rises rapidly to the Iclamp level 96 and remains there until the logic signal 100, Vclear, indicates that the short circuit has exceeded the allowed time limit, at which point the current again rises fairly rapidly up to the Iclear level 102 and remains there until the short circuit 92 clears. Once the short circuit clears 92, the current is immediately lowered to the Iclamp level 96 and then naturally decreases to level 98 dictated by the arc. It is important for the overall stability of the welding process that a short circuit not persist for an extended period of time, which it can be seen that within a short time of raising the current to the Iclear level, the short circuit cleared.

Table 1 below sets forth a series of exemplary values for the Iclamp and Iclear levels referenced above. The data in the table shown is for two different wire sizes (0.024" and 0.030" diameters) both with a shielding gas mixture of 75 percent Argon and 25 percent carbon dioxide, for several wire feed speeds (WFS). One skilled in the art will appreciate that the above are illustrative of only two wire sizes and that other wire sizes and shielding gas mixtures may require different values for Iclamp and Iclear. Wire feed speed is given in the units of inches per minute.

TABLE 1

| WFS | 0.024" Wire | | 0.030" Wire | |
| --- | --- | --- | --- | --- |
| | Iclamp | Iclear | Iclamp | Iclear |
| 150 | 120 A | 240 A | 160 A | 300 A |
| 200 | 120 A | 240 A | 180 A | 300 A |
| 250 | 140 A | 240 A | 200 A | 300 A |
| 300 | 150 A | 240 A | 220 A | 300 A |
| 350 | 160 A | 240 A | 240 A | 300 A |
| 400 | 170 A | 240 A | 260 A | 300 A |

Figure 7:
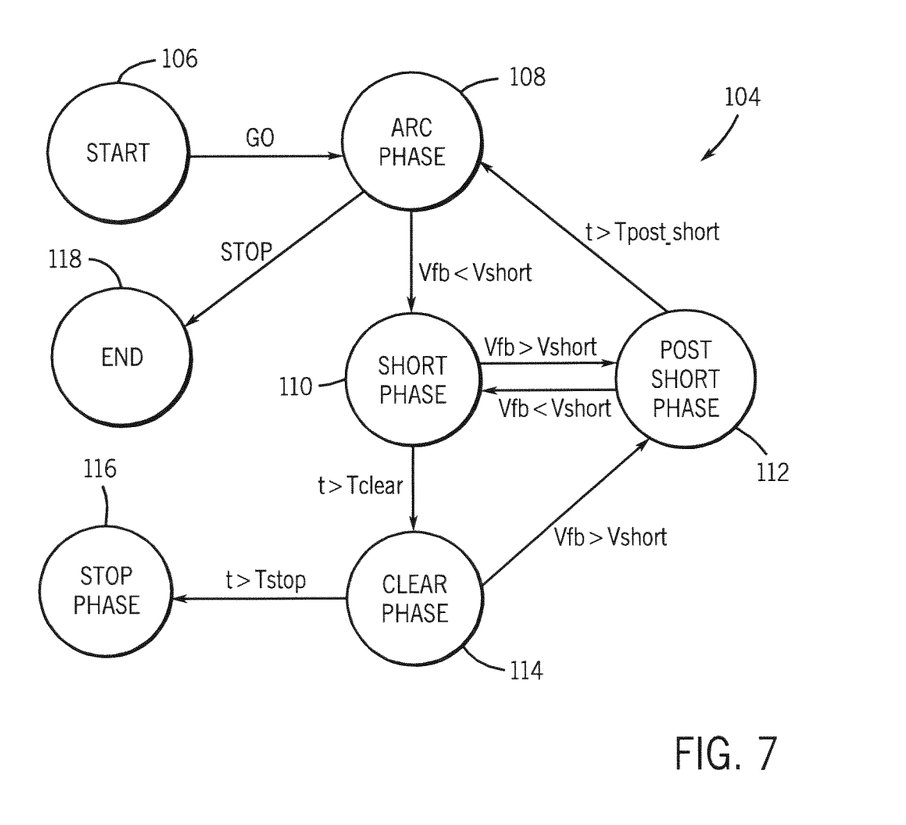
FIG. 7 is state diagram illustrating operational control of an 115V inverter for a MIG welding power source.

Referring now to FIG. 7, a state diagram 104 illustrates the sequence of operation of the inverter control. The process begins with an external command, which would typically be an operator input, initiating the process and causing transition from a Start Phase 106 to an Arc Phase 108. Upon detection of a short circuit, the control transitions to the Short Phase 110. Exit from the Short Phase 110 is either by detection of a voltage feedback signal indicating the short circuit has cleared whereby the control transitions to the Post Short Phase 112, or by the short circuit time exceeding the Tclear time, whereby the control transitions to the Clear Phase 114. Exit from the Clear Phase 114 is either by detection of a voltage feedback signal indicating the short circuit has cleared whereupon the control transitions to the Post Short Phase 112, or by the short time exceeding the Tstop time whereupon the control transitions to the Stop Phase 116. If a new short circuit occurs during the Post Short Phase 112 then the control transitions back to the Short Phase 110; otherwise transition out of the Post Short Phase 112 back to the Arc Phase 108 occurs when the time exceeds the Tpost_short time. The process ends upon detection of a stop command, which again would typically be an operator input, whereupon the control transitions from the Arc Phase to the End Phase 118.

During the Arc Phase 108, Short Phase 110, Clear Phase 114 and Post Short Phase 112, voltage feedback is compared to the voltage command signal, a voltage error signal is derived, the rate of change of the voltage error signal is limited to a specific rate which may vary for each phase, the maximum voltage error is compared to the maximum allowed voltage error for that phase, and this voltage error becomes the current command which dictates what the output current of the inverter is at that point in time.

It should be noted that for small diameter wires such as 0.024" and especially with a shielding gas mixture of 75 percent Argon and 25 percent $CO_2$, it is possible to weld at low average output currents in the range of 30 to 40 Amps. This low current range is ideal for very thin gauge sheet metal. For this low average output range it is desirable to keep the heat input as low as possible while at the same time maintaining a stable arc condition. In addition, a typical short circuit will clear in a reasonable time with only minimal additional current, typically well below the Iclamp values shown in Table 1. Also, often immediately after the short circuit clears there may be a spike or surge in the arc voltage. The voltage control loop will react to this spike which may be well beyond the voltage command level, and cause the output current to fall rapidly. This in turn leads to arc instability by forcing the current to a low value during a point in time where the arc is quite fragile.

Accordingly, this control may be revised for this low current range by limiting the rise rate to a fairly low value, typically in the range of 10 Amps/msec. However, if the rise rate is simply limited to this low value, the arc will become unstable because it will not be able to react to the occasional prolonged short circuit which does not clear at this low current level. Using a dual slope rise rate control where the rise rate switches to the much higher rate, i.e. approximately 100-200 Amps/msec, once the instantaneous output current exceeds a certain level, i.e. approximately 50-60 Amps, the stability improves as well as the low amperage performance.

Figure 8:
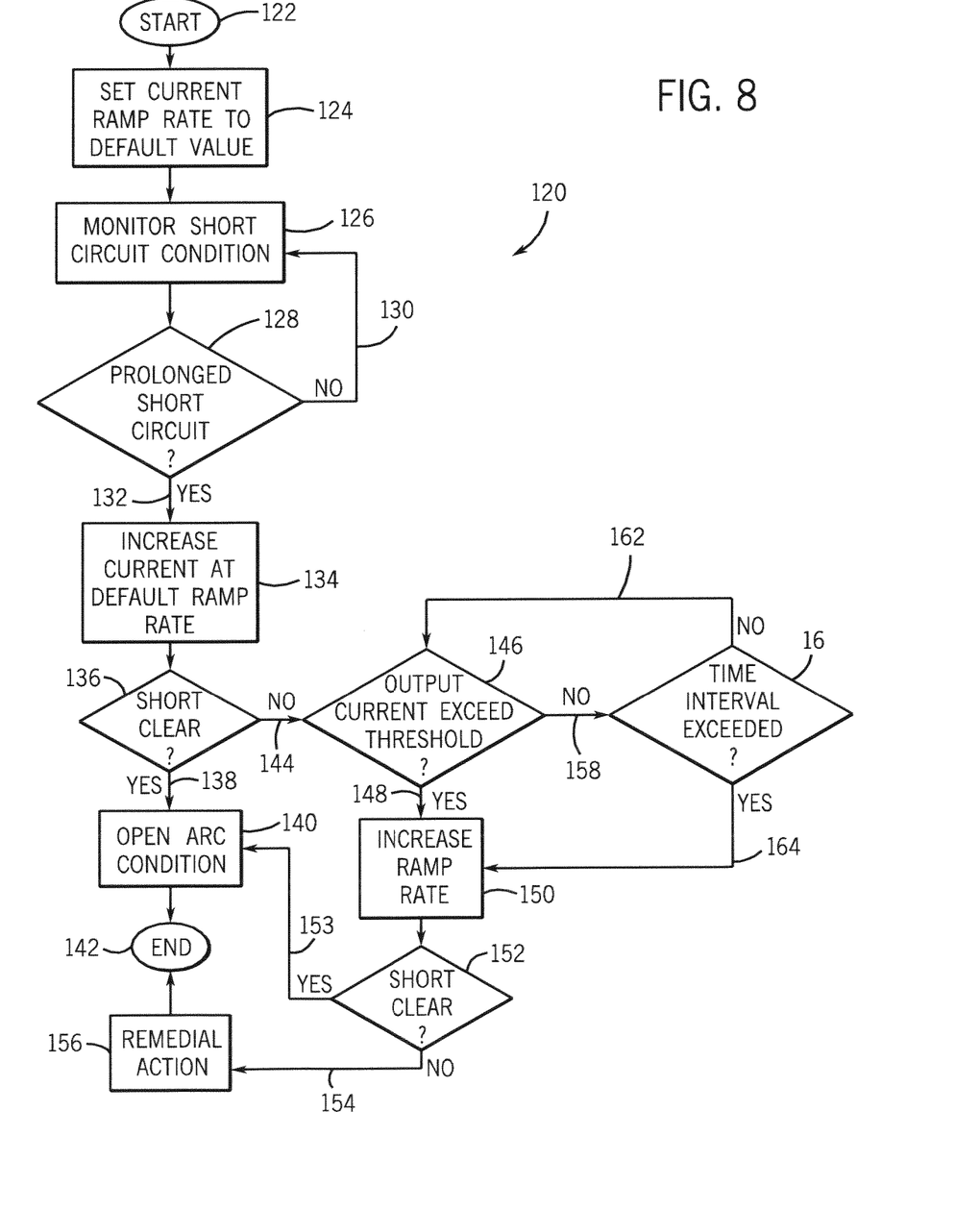
FIG. 8 is a flow chart setting forth the steps of a dual ramp rate algorithm in accordance with another embodiment of the invention.

The steps or acts achieved by a computer program or algorithm in accordance with the above-described dual slope rise rate control is shown in FIG. 8. Process 120 begins at 122 with the establishment of a current ramp rate default at 124. For low current applications, the current ramp rate default is set to a relatively low value, i.e. 10 Amps/msec. In one preferred embodiment, the default ramp rate is governed by the thickness of the consumable electrode being fed to the weld. However, one skilled in the art will appreciate that the default current ramp rate may be based on other and/or additional parameters.

At 126, a controller connected to various sensory components monitors short circuit condition at the weld. Accordingly, process 120 includes the step of determining whether a prolonged short circuit is occurring at the weld 128. If not 128, 130, the process 120 returns to step 126 with continued monitoring of the weld for a prolonged short circuit condition. However, if a prolonged short circuit is detected 128, 132, the output current of the power source is increased at the default ramp rate so as to clear the short circuit condition 134. Accordingly, at step 136, process 120 determines whether the short has, in fact, cleared. If yes 136, 138, an open arc condition 140 is deemed present at the weld. The open arc condition 140 will be maintained until another short circuit condition is created at the weld or the welding process ends at 142. On the other hand, if the short circuit has failed to clear 136, 144, a determination is made whether the output current has exceeded a pre-set threshold at 146. In one exemplary embodiment, the pre-set threshold is set to a value of approximately 50-60 Amps. As such, if the output current exceeds the pre-set threshold 146, 148, the current is increased at a higher ramp rate 150. For example, the second ramp rate may be approximately 100-200 Amps/msec as compared to the 10 Amp/msec default ramp rate. Under most conditions, the short circuit will clear when the output current is increased at the second ramp rate. As such, process 120 continues with the determination at 152 as to where the short circuit has cleared. If so 153, 154, an open arc condition is deemed present at the weld 140. If not 152, 154, process 120 continues with the taking of remedial action at step 156. As discussed previously, the remedial action may include shutting off of the inverter power supply as well as adjusting the wire feed parameters, i.e. retracting wire from the weld.

If at step 146 process 120 determines that the output current threshold has not been exceeded 158, a comparison is made to determine when the short at the weld has exceeded a specified time interval. That is, at 160, the length of time of the prolonged short circuit is compared to a threshold to determine if a pre-set time interval has been exceeded. If not 160, 162, process 120 leaps back to step 146 for continued monitoring of the output current relative to the pre-set current threshold. However, if the time interval has been exceeded 160, 164, the output current is increased pursuant to the second ramp rate at step 150 independent of the current level relative to the current threshold.

Figure 9:
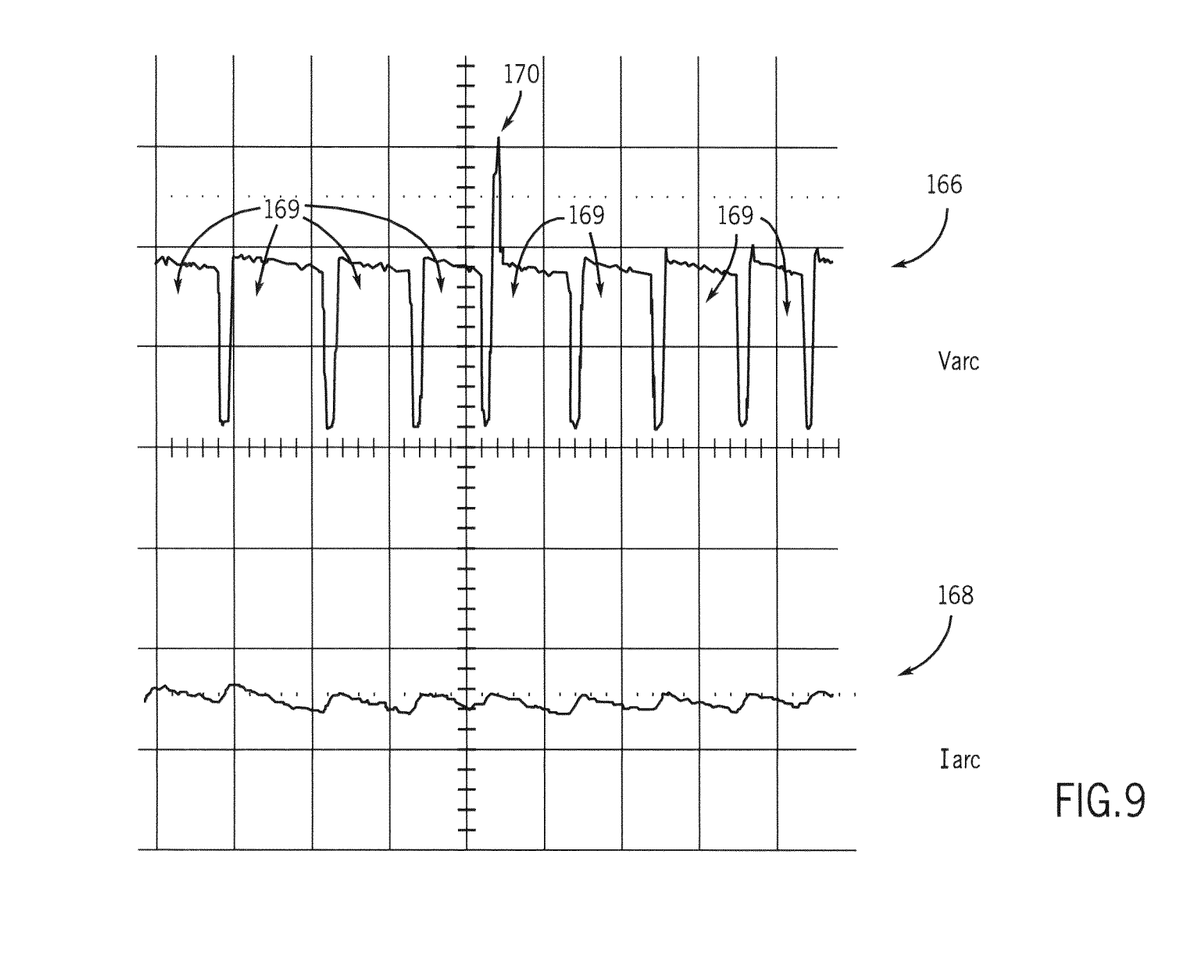
FIG. 9 represents a pair of waveforms for exemplary voltage and current resulting from implementation of the control illustrated in FIG. 8.

Referring now to FIG. 9, a pair of waveforms illustrates voltage and current conditions as a result of implementation of the low current control process described above with respect to FIG. 8. Waveform 166 corresponds to the out voltage whereas waveform 168 corresponds to the arc current. As readily shown, the current does not rise significantly above an average value during a typical short circuit 169. Additionally, it can be seen that during a relatively large spike or surge in voltage after the short clears 170 the output current of the power source does not fall abruptly. That is, there is very little difference between the arc phase with the voltage spike and a typical arc phase. In this regard, arc instability is neutralized by preventing the output current to fall rapidly to a relatively low value.

Figure 10:
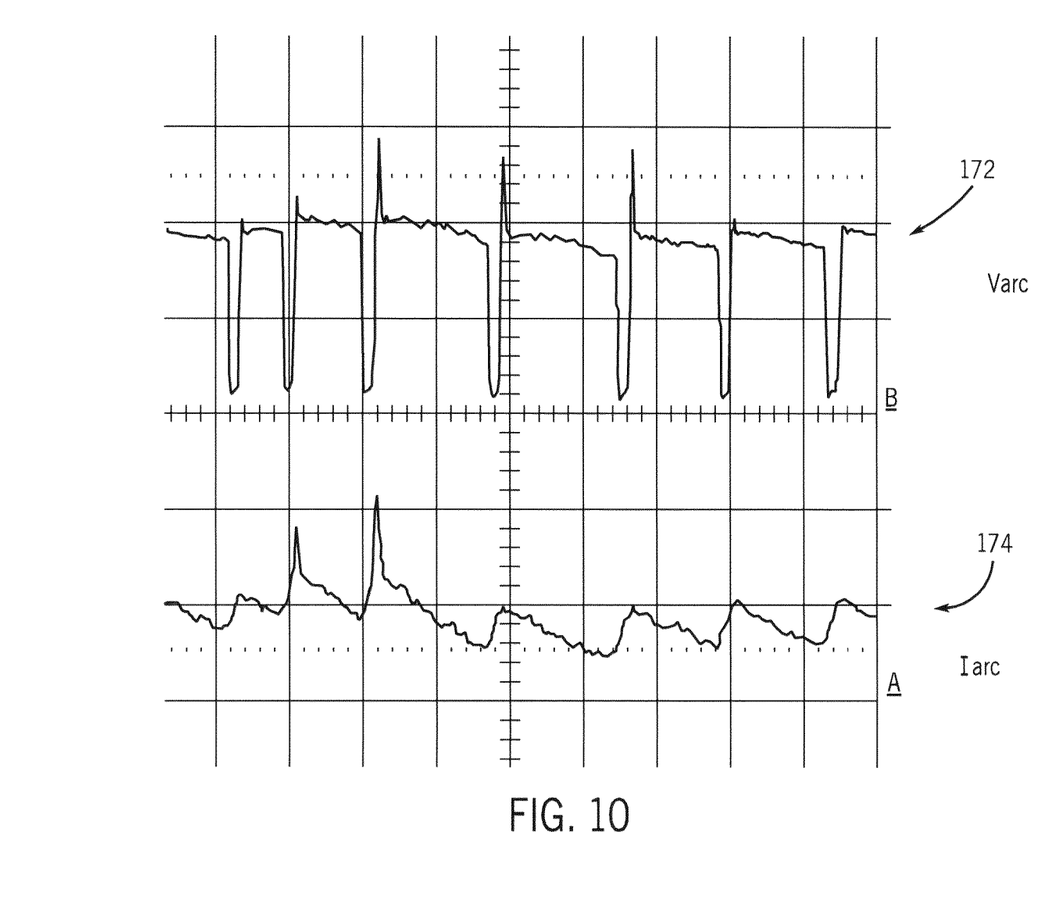
FIG. 10 represents a pair of waveforms illustrating commonalities in slope between voltage and current resulting from implementation of the control illustrated in FIG. 8.

FIG. 10 illustrates another example of voltage and current waveforms resulting from implementation of the low current control described with respect to FIG. 8. Signal 172 corresponds to the arc voltage whereas signal 174 corresponds to arc current. The waveforms illustrate the dual slope on the rate of change of current for a couple of short circuits. For the illustrated short circuits, the short did not clear before the current reached the threshold level for the higher current ramp rate in which case the current rises more rapidly. Once the current falls below the threshold level, the ramp rate drops back to the lower default value.

Therefore, in accordance with one embodiment of the present invention, a MIG welding power source has a raw power input configured to receive a raw power signal for a MIG welding process. The raw power signal has a voltage level of at least approximately 115V. The power source includes an inverter configured to receive the 115V signal and provide a welding output suitable for MIG welding. The power source further includes a welding power output configured to supply the welding output for a MIG welding process.

In accordance with another embodiment, the present invention includes a method of regulating a power source having an 115V inverter to condition raw power into a form usable by a MIG welding process. The method includes determining a maximum allowable voltage error given an output condition at a weld and determining an instantaneous command current given the maximum allowable voltage error. The method further includes inputting a signal proportional to the instantaneous command current to a controller of the 115V inverter. The signal is designed to regulate the controller to provide a control signal to regulate an output of the 115V inverter.

According to another embodiment of the present invention, a MIG welding system includes a power source having an 115V inverter configured to condition a raw power input into a form usable by a MIG welding process. They system also has a wire feeder connected to the power source and configured to introduce a consumable electrode to a weld and an electrode holder configured to receive the consumable electrode and place the consumable electrode in relative proximity to a workpiece at the weld.

According to yet a further embodiment of the present invention, a method of controlling output of a MIG welding power source includes a step of detecting a prolonged short circuit at a weld. The method also includes the step of increasing output current at a first ramp rate so as to clear the prolonged short circuit at the weld. The output current is then increased to a second ramp rate once the output current reaches a preset threshold.

The present invention has been described in terms of the preferred embodiment, and it is recognized that equivalents, alternatives, and modifications, aside from those expressly stated, are possible and within the scope of the appending claims.

What is claimed is:

1. A method of regulating a power source having an 115V inverter to condition raw power into a form usable by a MIG welding apparatus, the method comprising the step of:
   determining a maximum allowable voltage error based on an output condition at a weld, wherein the maximum allowable voltage error comprises a clamped voltage error between a voltage feedback signal from the weld and a voltage command signal;
   determining an instantaneous command current based at least in part on the maximum allowable voltage error and based at least in part on inputs relating to operation of the MIG welding apparatus, wherein the inputs are different than the voltage command signal; and
   inputting a signal proportional to the instantaneous command current to a controller of the 115V inverter, the signal designed to regulate the controller to provide a control signal to regulate an output of the 115V inverter.

2. The method of claim 1 further comprising the step of inputting a signal indicative of the instantaneous command current to regulate what level of output the 115V inverter should generate.

3. The method of claim 1 further comprising the step of pulse width modulating the 115V inverter to regulate the output of the 115V inverter.

4. The method of claim 1 wherein the step of determining a maximum allowable voltage error includes the step of subtracting a voltage feedback signal from the weld from a voltage command signal.

5. The method of claim 1 further comprising the step of controlling the 115V inverter to produce either a constant current (CC) or a constant voltage (CV) output.

6. The method of claim 1 further comprising the steps of:
   detecting a welding state at the weld;
   limiting an output current to a predetermined maximum level during an arc phase at the weld; and
   limiting the output current to an instantaneous maximum level based on instantaneous welding parameters during a short circuit at the weld.

7. The method of claim 6 further comprising the steps of:
   monitoring duration of a short circuit at the weld;
   comparing the duration to a default value; and
   allowing the output current to increase to a clear level when the duration exceeds the default value.

8. The method of claim 7 further comprising the step of shutting off the 115V inverter or retracting wire from the weld when the output current is at the clear level and the short circuit persists.

9. The method of claim 7 further comprising the step of lowering the output current to a level lower than the clear level after allowing the output current to increase to a clear level.

10. The method of claim 9 further comprising the step of allowing the 115V inverter to output power greater than a normal output power rating during a post-short circuit condition.

11. A controller to regulate a MIG welding power source having an 115V inverter, the controller configured to execute a series of instructions that when executed cause the controller to:
   determine a maximum allowable voltage variance based on a monitored condition at a weld that receives power thereat from the MIG welding power source, wherein the monitored condition comprises the condition of the welding arc load and the maximum allowable voltage variance comprises the variance between a voltage feedback signal and a voltage command signal;
   determine an instantaneous command current based at least in part on the maximum allowable voltage variance and based at least in part on inputs relating to operation of the MIG welding power source, wherein the inputs are different than the voltage command signal; and
   provide an input to the 115V inverter that is a function of the instantaneous command current to cause the MIG welding power source to provide a desired output.

12. The controller of claim 11 further caused to:
   detect a weld state at the weld;
   regulate the MIG welding power source to provide a predetermined limited output current during an arc phase at the weld; and
   regulate the MIG welding power source to provide an instantaneous limited output current during a short circuit at the weld, the instantaneous limited output current based on instantaneous welding parameters.

13. The controller of claim 12 further caused to:
   monitor duration of a short at the weld;

compare the duration to a default;

cause the MIG welding power source to deliver an output current that will clear the short when the duration exceeds the default, and shut-off the MIG welding power source or retract wire from the weld based on the weld state at the weld.

14. The controller of claim 13 further caused to cause the MIG welding power source to output power at a reduced current level that is lower than that provided to clear the short if the short clears.

15. The controller of claim 12 further caused to determine the maximum allowable voltage variance from a difference between a commanded voltage value and a feedback voltage from the weld.

16. A MIG welding power source comprising:

a 115V inverter; and a processor programmed to:

receive a voltage feedback signal from a weld;

determine a voltage offset from the voltage feedback signal and a commanded voltage level;

clamp the voltage offset at a maximum level based on an output condition at the weld;

determine an instantaneous command current based at least in part on the voltage offset and based at least in part on inputs relating to operation of the MIG welding power source, wherein the inputs are different that the commanded voltage level;

input a signal to the 115V inverter proportioned to the instantaneous command current to cause the 115V inverter to output a desired output.

17. The MIG welding power source of claim 16 wherein the processor is further programmed to receive feedback indicative of an extended short at the weld and cause the 115V inverter to provide a reduced current output to clear the extended short.

18. The MIG welding power source of claim 17 wherein the processor is further programmed to cease power delivery to the weld.

19. The MIG welding power source of claim 16 wherein the 115V inverter is connected to a power input designed to receive a 230V input.

20. The MIG welding power source of claim 16 further comprising an output terminal configured to receive a cable connected to a wire feeder.

* * * * *